UNITED STATES PATENT OFFICE.

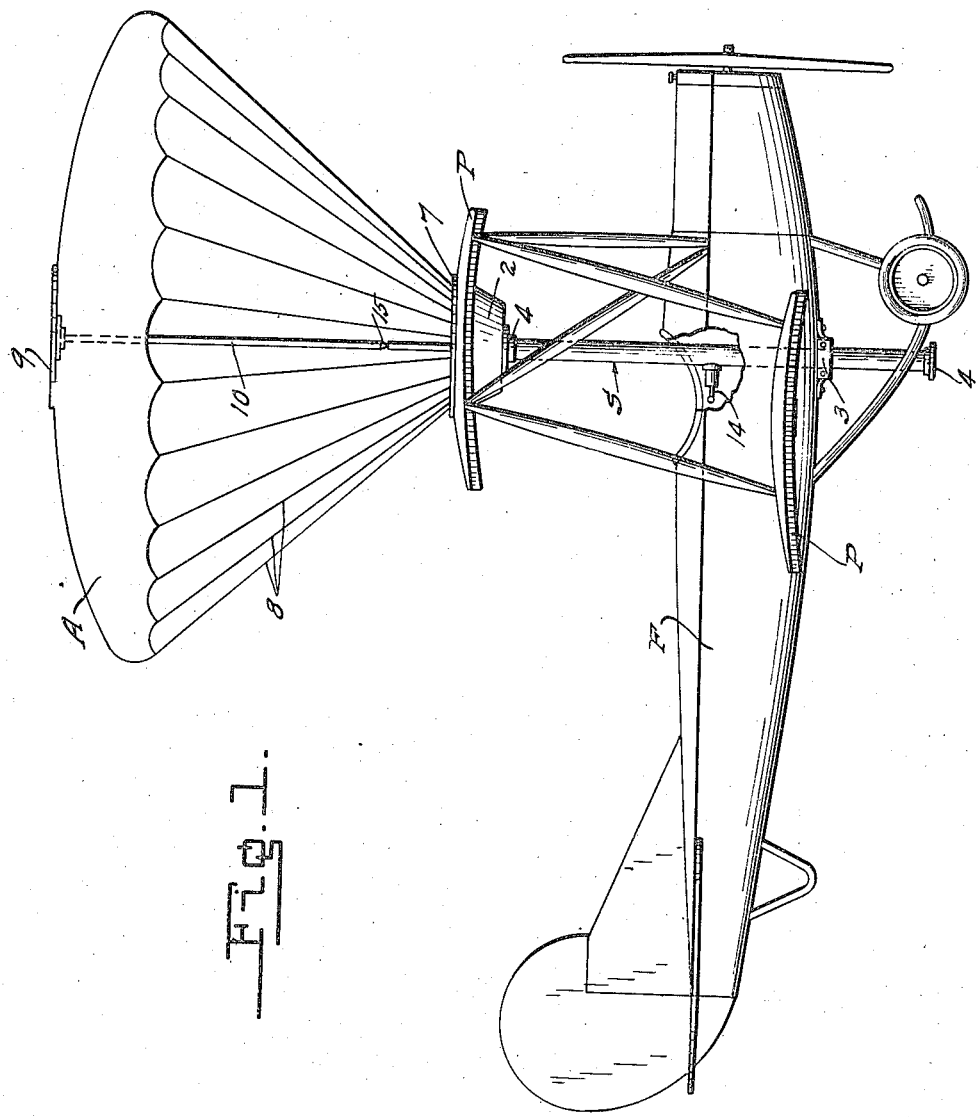

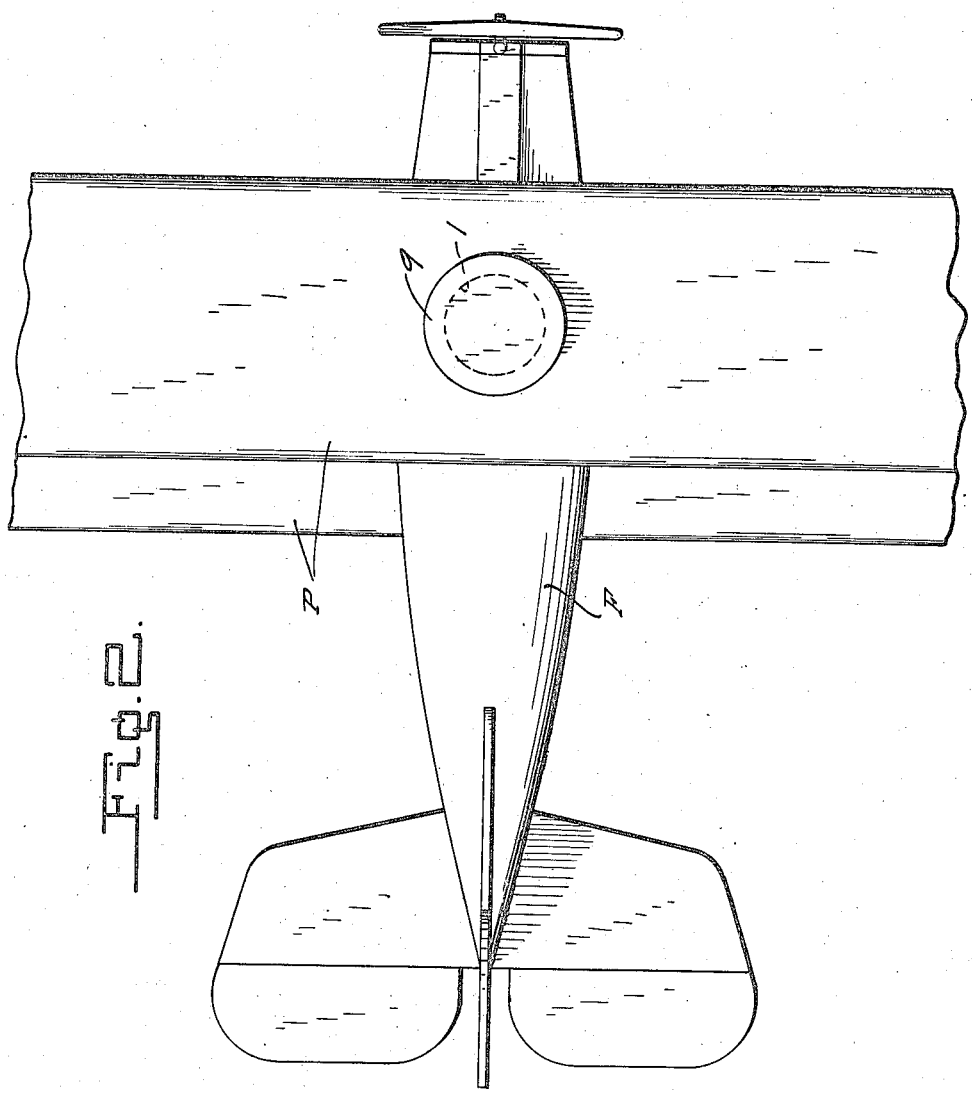

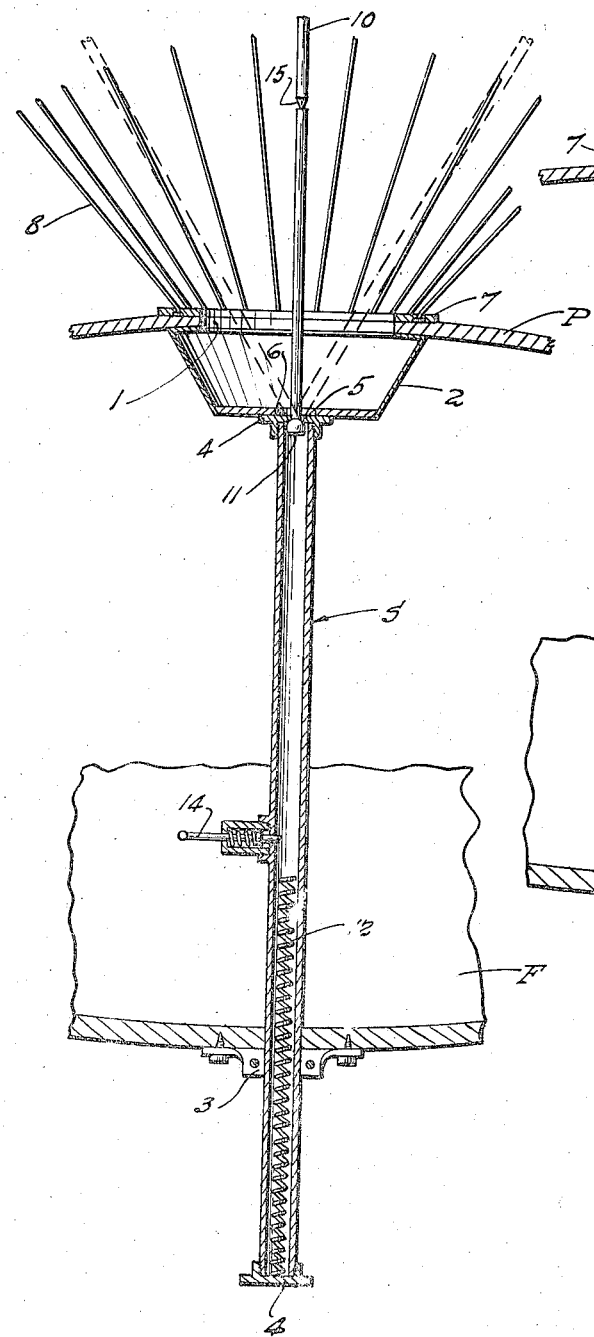
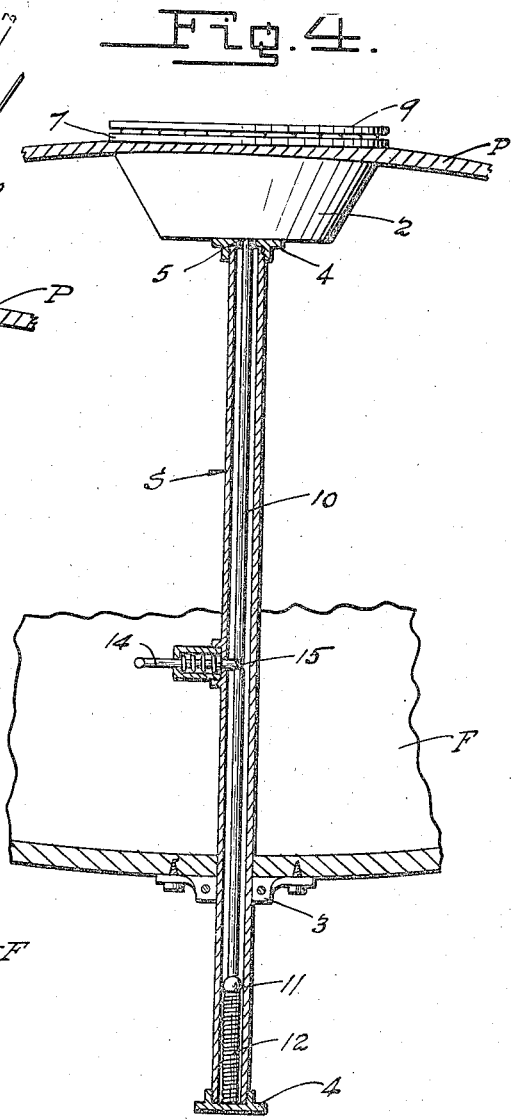

JOHN HAYES, OF BELLE VERNON, PENNSYLVANIA.

AEROPLANE.

1,423,611.  Specification of Letters Patent.  Patented July 25, 1922.

Application filed February 15, 1922. Serial No. 536,724.

*To all whom it may concern:*

Be it known that I, JOHN HAYES, a citizen of the United States, residing at Belle Vernon, in the county of Fayette and State of Pennsylvania, have invented certain new and useful Improvements in Aeroplanes, of which the following is a specification, reference being had to the accompanying drawings.

This invention relates to certain improvements in aeroplanes and it is an object of the invention to provide a device of this general character with novel and improved means whereby a parachute may be employed to effect a safe landing of the aeroplane in the event the same should otherwise fail to sustain itself in flight.

Another object of the invention is to provide a novel and improved parachute structure for use in connection with an aeroplane wherein the parachute is normally maintained folded or compacted, together with means whereby the parachute may be readily released to permit the same to open when the necessities of practice may require.

The invention consists in the details of construction and in the combination and arrangement of the several parts of my improved aeroplane whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation and of a somewhat diagrammatic character illustrating an aeroplane having a parachute structure applied thereto constructed in accordance with an embodiment of my invention;

Figure 2 is a view in top plan of an aeroplane with the parachute structure in its normal or inoperative arrangement;

Figure 3 is an enlarged fragmentary sectional view illustrating in detail the associated parts of the parachute construction and in a position with the parachute extended or open; and Figure 4 is a view similar to Figure 3 with the parachute in its normal or compacted position.

As disclosed in the accompanying drawings, F denotes the fuselage of an aeroplane of a conventional type and P the planes associated therewith. The top plane P at its central portion is provided with an opening 1 and depending from said top plane and surrounding the opening 1 is a basket 2 in which the parachute A, when folded, is compacted so that normally the parachute A is effectively housed and maintained in such condition whereby the parachute will offer no hindrance or obstruction to the flight of the aeroplane under normal conditions.

S denotes a vertically disposed tubular standard which has its upper end portion in contact with the bottom of the basket 2 and which standard is of a length to extend through the bottom of the fuselage as is clearly illustrated in the accompanying drawings. This standard S is held in applied position by the holding members 3 which may be as preferred. The opposite ends of the standard S are closed by the heads 4 and the upper head 4 is provided with a restricted opening 5 which registers with a larger opening 6 in the bottom of the basket 2.

Secured to the upper face of the top plane P and substantially defining the opening 1 is an annular member or plate 7 to which are secured the extremities of the flexible members or ropes 8 associated with the parachute A. These flexible members or ropes 8, when the parachute A is folded or compacted, are also encased or housed within the basket 2.

The central portion of the parachute A is secured to a circular disc or crown piece 9 of a diameter equal to the major diameter of the annular member or plate 7 so that, when the parachute is in its normal or inoperative arrangement, the disc or crown piece 9 serves to substantially close the opening 1 in the upper plane P. Suitably secured to the disc or crown piece 9 at the axial center thereof is the outer end portion of a rod 10, said rod telescopically engaging within the standard S. The inner or inserted end of the standard S is provided with an enlargement or head 11 substantially semicircular in form with its convex face upwardly directed. The rod 10 passes through the restricted opening 5 in the upper head 4.

When the parachute A is in extended or open position and functioning to retard the descent of the aeroplane, the enlargement or head 11 engages the upper head 4 and the convex surface of the enlargement or head 11 permits the parachute A to have swaying movement relative to the aeroplane proper without hindrance or obstruction being offered to said movement by the rod 10, it being understood that the head or enlargement 11 provides a universal joint.

When the parachute A and its associated members or ropes 8 are housed within the basket 2, the rod 10 is forced downward within the standard S and this rod 10 is of such length when forced inwardly in the standard S to place under compression the coil spring 12 and when the rod 10 is at the limit of its downward movement, a spring-pressed bolt 14 engages an annular shoulder 15 carried by the rod 10 whereby said rod is held against upward movement. The bolt 14 extends in a direction away from the standard S and is positioned within the pit of the fuselage and readily engageable by the pilot or other occupant of the fuselage. Should the aeroplane from any cause be unable to sustain itself during flight and start to fall, an occupant of the fuselage pulls the bolt 14 outwardly which releases the rod 10 whereupon the resultant expansion of the spring 12 imparts an initial upward movement to the rod 10 and to a sufficient extent to carry the parachute A upwardly and out of the basket 2 so that it will be in the best possible position to open up and thereby retard the downward movement or fall of the aeroplane so that a safe landing will be assured.

From the foregoing description it is thought to be obvious that an aeroplane constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with the fuselage of an aeroplane and a supporting plane therefor, said plane being provided with an opening, a parachute, flexible means for connecting said parachute to the portion of the plane defining the opening, said parachute when collapsed being insertable through the opening in the plane, a rod secured to the central portion of the parachute, a tubular standard carried by the fuselage and extending from the plane through the pit of the fuselage, said rod being telescopically engaged within the standard, means placed under tension when the rod is forced inwardly of the standard to force the rod and parachute outwardly through the opening in the plane, and means carried by the standard and engaging the rod for holding the rod against outward movement with respect to the standard, said last named means being positioned within the pit of the fuselage.

2. In combination with the fuselage of an aeroplane and a supporting plane therefor, said plane being provided with an opening, a parachute, flexible means for connecting said parachute to the portion of the plane defining the opening, said parachute when collapsed being insertable through the opening in the plane, a rod secured to the central portion of the parachute, a tubular standard carried by the fuselage and extending from the plane through the pit of the fuselage, said rod being telescopically engaged within the standard, means placed under tension when the rod is forced inwardly of the standard to force the rod and parachute outwardly through the opening in the plane, a sliding bolt carried by the standard, and means for constantly urging said bolt inwardly of the standard, the rod having a shoulder with which the bolt engages when the rod is moved inwardly of the standard.

3. In combination with the fuselage of an aeroplane and a supporting plane therefor, said plane being provided with an opening, a parachute, flexible means for connecting said parachute to the portion of the plane defining the opening, said parachute when collapsed being insertable in the opening of the plane, a rod secured to the central portion of the parachute, a tubular standard carried by the fuselage and extending to the plane, said rod being telescopically engaged within the standard and extending through the opening in the plane, and means placed under tension when the rod is forced inwardly of the standard to force the rod and parachute outwardly through the opening, the inserted end portion of the rod being provided with an enlargement, the standard having a head with which the enlargement of the rod engages to limit the outward movement of the rod and to permit the parachute to have swinging movement relative to the aeroplane.

In testimony whereof I hereunto affix my signature.

JOHN HAYES.